US012493309B2

(12) United States Patent
Hong et al.

(10) Patent No.: US 12,493,309 B2
(45) Date of Patent: Dec. 9, 2025

(54) INTERNAL REFERENCE VOLTAGE GENERATION DEVICE

(71) Applicant: SK hynix Inc., Icheon-si (KR)

(72) Inventors: Jae Hyeong Hong, Icheon-si (KR); Jung Yeop Lee, Icheon-si (KR); Bon Kwang Koo, Icheon-si (KR); Heon Ki Kim, Icheon-si (KR); Young Seok Nam, Icheon-si (KR); Young Jo Park, Icheon-si (KR); Keun Seon Ahn, Icheon-si (KR); Soon Sung An, Icheon-si (KR); Sung Hwa Ok, Icheon-si (KR); Se Min Lee, Icheon-si (KR); Seung Yeop Lee, Icheon-si (KR); Nam Hea Jang, Icheon-si (KR); Jun Seo Jang, Icheon-si (KR); Ji Eun Joo, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 308 days.

(21) Appl. No.: 18/316,972

(22) Filed: May 12, 2023

(65) Prior Publication Data

US 2024/0184318 A1 Jun. 6, 2024

(30) Foreign Application Priority Data

Dec. 6, 2022 (KR) ........................ 10-2022-0168278

(51) Int. Cl.
*G05F 1/56* (2006.01)

(52) U.S. Cl.
CPC ..................................... *G05F 1/56* (2013.01)

(58) Field of Classification Search
CPC ........... G05F 1/56; G05F 1/468; G11C 5/147; G11C 16/30
USPC .......................................................... 323/281
See application file for complete search history.

(56) References Cited

U.S. PATENT DOCUMENTS

| | | | | |
|---|---|---|---|---|
| 10,296,031 | B2 | 5/2019 | Kim | |
| 2011/0012882 | A1* | 1/2011 | Jeong | G09G 3/3696 345/87 |
| 2011/0175877 | A1* | 7/2011 | Weng | G09G 3/3688 345/211 |
| 2014/0145690 | A1* | 5/2014 | Lee | G11C 5/147 323/265 |
| 2016/0370820 | A1* | 12/2016 | Kim | G05F 3/16 |
| 2020/0409405 | A1* | 12/2020 | Kwon | G05F 3/08 |
| 2022/0068404 | A1* | 3/2022 | Janjua | G11C 8/08 |
| 2023/0146885 | A1* | 5/2023 | Kim | G11C 5/147 327/108 |

FOREIGN PATENT DOCUMENTS

| | | | |
|---|---|---|---|
| KR | 10-2001-0060478 | A | 7/2001 |
| KR | 10-2012-0121732 | A | 11/2012 |

* cited by examiner

*Primary Examiner* — Yemane Mehari

(57) ABSTRACT

An internal reference voltage generation device may include a cell array including a plurality of cells which provide reference voltages of different levels. Each of the plurality of cells may include one of a plurality of divider resistors included in a resistor string; a transmission gate configured to output a voltage of a divider node which is connected to the one divider resistor, in response to a select signal; and a unit decoder configured to provide the select signal to the transmission gate.

20 Claims, 8 Drawing Sheets

INTERNAL REFERENCE VOLTAGE GENERATION DEVICE

CROSS-REFERENCE TO RELATED APPLICATION

The present application claims priority under 35 U.S.C. § 119(a) to Korean Patent Application No. 10-2022-0168278 filed in the Korean Intellectual Property Office on Dec. 6, 2022, which is incorporated herein by reference in its entirety.

BACKGROUND

1. Technical Field

Various embodiments generally relate to a semiconductor technology, and more particularly, to an internal reference voltage generation device of a semiconductor device.

2. Related Art

Unlike a semiconductor device that receives a differential signal, a semiconductor device that receives a single-ended signal requires a reference voltage for determining a logic level of a received data signal.

A semiconductor device to which single-ended signaling or pseudo-differential signaling is applied compares a voltage of a data signal and a reference voltage in an input buffer configured by a comparator. The input buffer generates an internal signal of a logic high level and transfers the internal signal of a logic high level to an internal logic when the voltage of the received data signal is larger than the reference voltage. The input buffer generates an internal signal of a logic low level and transfers the internal signal of a logic low level to an internal logic when the voltage of the received data signal is smaller than the reference voltage.

An internal reference voltage generation device serves to generate a reference voltage using a power supply voltage. The internal reference voltage generation device is configured to include a resistor string, which includes a plurality of divider resistors that are connected in series between a power supply voltage terminal and a ground voltage terminal, and a plurality of transmission gates that select one of a plurality of divider nodes on the resistor string and output the voltage of a selected divider node as the reference voltage.

After the input buffer is powered on, I/O blocks of a memory should be ready to receive data and a clock from a controller. To this end, a settling time after the internal reference voltage generation device is enabled is important.

Since the resistor string, which is an analog circuit, is vulnerable to noise, in order to minimize power noise, the resistor string is disposed in a separate region by being spaced apart from a digital block (transmission gates, decoders, etc.). However, in this case, since a divider resistor and a transmission gate that are connected in common to one node are located far apart from each other, a problem may arise in that the length of the wiring that constitutes the node is too long and an RC delay increases, which results in lengthening a settling time.

SUMMARY

Various embodiments are directed to an internal reference voltage generation device capable of minimizing power noise and shortening a settling time.

In an embodiment, an internal reference voltage generation device may include: a cell array including a plurality of cells that provide reference voltages of different levels, each of the plurality of cells including: one of a plurality of divider resistors included in a resistor string; a transmission gate configured to output a voltage of a divider node which is connected to the one divider resistor, in response to a select signal; and a unit decoder configured to provide the select signal to the transmission gate.

In an embodiment, an internal reference voltage generation device may include: a resistor string configured to divide a power supply voltage into a plurality of levels; a voltage selection switch unit including a plurality of transmission gates that are connected to a plurality of divider nodes, respectively, of the resistor string and that output a voltage of any one among the plurality of divider nodes as a reference voltage in response to a select signal; and a decoder unit including a plurality of unit decoders that provide the select signal to the plurality of transmission gates, wherein one of divider resistors of the resistor string, one transmission gate that is connected to one divider node in common with the one divider resistor and one unit decoder that provides the select signal to the one transmission gate are grouped and disposed to configure one cell.

DETAILED DESCRIPTION

Figure 1:
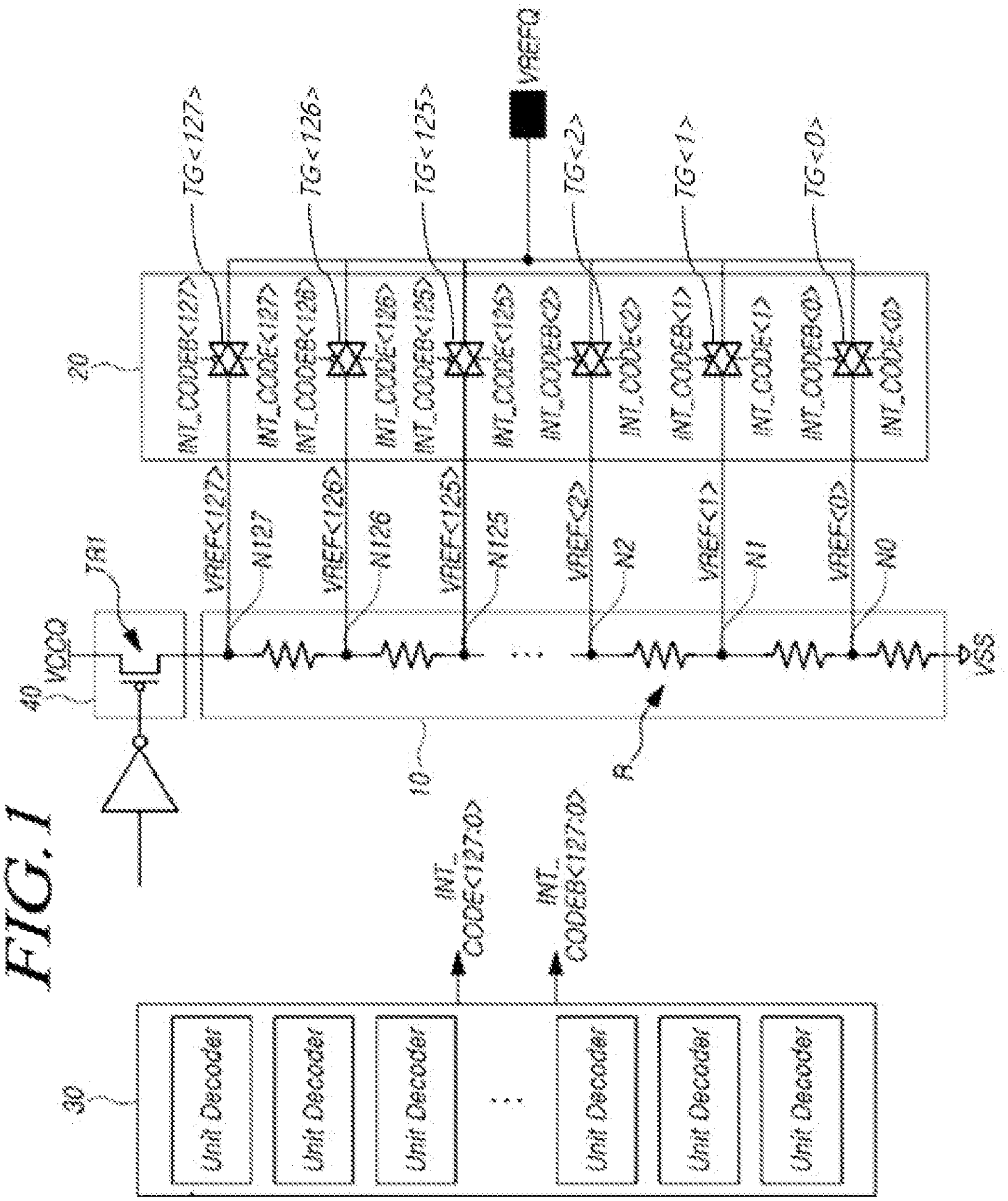
FIG. 1 is a circuit diagram of an internal reference voltage generation device according to an embodiment of the disclosure.

Advantages and features of the disclosure and methods to achieve them will become apparent from the descriptions of exemplary embodiments herein below with reference to the accompanying drawings. However, the present disclosure is not limited to the exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined only by the claims.

Since the figures, dimensions, ratios, angles, numbers of elements given in the drawings to describe embodiments of the disclosure are merely illustrative, the present disclosure is not limited to the illustrated matters. Throughout the specification, like reference numerals refer to like components. In describing the disclosure, when it is determined that the detailed description of the related art may obscure the gist of the disclosure, the detailed description thereof will be omitted. It is to be noticed that the terms "comprising," "having," "including" and so on, used in the description and claims, should not be interpreted as being restricted to the means listed thereafter unless specifically stated otherwise. Where an indefinite or definite article, e.g., "a," "an" or "the," is used when referring to a singular noun, the article may include a plural of that noun unless specifically stated otherwise.

In interpreting elements in embodiments of the disclosure, they should be interpreted as including error margins even without explicit statements.

Also, in describing the components of the disclosure, there may be used terms such as first, second, A, B, (a), and (b). These are solely for the purpose of differentiating one component from another component but do not limit the substances, order, sequence or number of the components. Also, components in embodiments of the disclosure are not limited by these terms. These terms are used to merely distinguish one component from another component. Accordingly, as used herein, a first component may be a second component within the technical spirit of the disclosure.

If a component is described as "connected," "coupled" or "linked" to another component, it may mean that the component is not only directly "connected," "coupled" or "linked" but also is indirectly "connected," "coupled" or "linked" via a third component. In describing positional relationships, such as "an element A on an element B," "an element A above an element B," "an element A below an element B" and "an element A next to an element B," one or more other elements may be disposed between the elements A and B unless the term "directly" or "immediately" is explicitly used.

Features of various exemplary embodiments of the disclosure may be coupled, combined or separated partially or totally. Technically various interactions and operations are possible. Various exemplary embodiments can be practiced individually or in combination.

Hereinafter, various examples of embodiments of the disclosed technology will be described in detail with reference to the accompanying drawings.

FIG. 1 is a circuit diagram of an internal reference voltage generation device according to an embodiment of the disclosure.

Referring to FIG. 1, an internal reference voltage generation device may include a resistor string 10, a voltage selection switch unit 20, a decoder unit 30, and a resistor string enable unit 40. The internal reference voltage generation device may further include an enable signal generator (not illustrated).

The resistor string 10 may include a plurality of divider resistors R, which are connected in series. One end of the resistor string 10 may be connected to a first voltage terminal through the resistor string enable unit 40, and the other end of the resistor string 10 may be connected to a second voltage terminal.

For example, a first voltage may be a power supply voltage VCCQ, and a second voltage may be a ground voltage VSS. Hereinafter, for the sake of convenience in explanation, the first voltage refers to the power supply voltage VCCQ and the second voltage refers to the ground voltage VSS, but embodiments of the disclosed technology are not limited thereto.

The power supply voltage VCCQ is divided at different divider ratios by the plurality of divider resistors R, so the voltages of divider nodes N0 to N127 of the resistor string 10 may have different levels.

For example, when the divider resistors R have the same resistance value, voltage levels of the divider nodes N0 to N127 may have values corresponding to 1/128*VCCQ, 2/128*VCCQ, . . . , 127/128*VCCQ and 128/128*VCCQ, respectively, in an order from the divider node N0 closest to the ground voltage terminal to the divider node N127 closest to the power supply voltage terminal.

The voltage selection switch unit 20 may receive select signals INT_CODE<127:0> and INT_CODEB<127:0> from the decoder unit 30. The voltage selection switch unit 20 may select one of the divider nodes N0 to N127 of the resistor string 10 in response to the select signals INT_CODE<127:0> and INT_CODEB<127:0> received from the decoder unit 30, and may output the voltage of a selected divider node to an output voltage terminal VREFQ. Accordingly, one of voltages of the divider nodes N0 to N127 of the resistor string 10 may be set as a reference voltage.

The voltage selection switch unit 20 may include a plurality of transmission gates TG<0> to TG<127>. The plurality of transmission gates TG<0> to TG<127> may have ends that are connected to the divider nodes N0 to N127, respectively, of the resistor string 10. The other ends are connected in common to the output voltage terminal VREFQ.

When the select signals INT_CODE<127:0> and INT_CODEB<127:0> are received from the decoder unit 30, one of the plurality of transmission gates TG<0> to TG<127> may be turned on and the others of the plurality of transmission gates TG<0> to TG<127> may be turned off in response to the received select signals INT_CODE<127:0> and INT_CODEB<127:0>. The voltage of a divider node to which a turned-on transmission gate is connected may be transferred to the output voltage terminal VREFQ.

The decoder unit 30 may receive internal reference voltage setting codes CODE<6:0> and CODEB<6:0> from the enable signal generator (not illustrated). The decoder unit 30 may generate the select signals INT_CODE<127:0> and INT_CODEB<127:0> by decoding the internal reference voltage setting codes CODE<6:0> and CODEB<6:0> received from the enable signal generator.

The decoder unit 30 may include a plurality of unit decoders Unit Decoder U-DEC corresponding to the plurality of transmission gates TG<127:0>, respectively.

The unit decoder U-DEC may generate select signals INT_CODE<#> and INT_CODEB<#> by calculating internal reference voltage setting codes. Combinations of different internal reference voltage setting codes may be inputted to different unit decoders U-DEC.

Select signals INT_CODE<#> and INT_CODEB<#> outputted from each unit decoder U-DEC may be provided to a corresponding transmission gate TG<#>. In response to the select signals INT_CODE<#> and INT_CODEB<#>, one of the plurality of transmission gates TG<0> to TG<127> may be turned on and the others of the plurality of transmission gates TG<0> to TG<127> may be turned off. The voltage of a divider node to which a turned-on transmission gate TG is connected may be outputted to the output voltage terminal VREFQ to be set as a reference voltage.

The resistor string enable unit 40 may include a MOS transistor TR1, which is connected between the power supply voltage VCCQ, and the resistor string 10. When the MOS transistor TR1 is turned on, the power supply voltage VCCQ may be applied to the resistor string 10, and may be divided at a predetermined divider ratio by the resistor string 10.

A semiconductor device may receive a control signal for setting a reference voltage from a controller through data input and output lines. The control signal may be a combination of a command, an address and data. For example, the semiconductor device may receive, as the control signal, a reference voltage setting command (a command), a reference voltage setting address (an address) and an external reference voltage setting code (data).

The enable signal generator (not illustrated) may generate an enable signal in response to the reference voltage setting command received from the controller, and may provide the generated enable signal to the decoder unit 30. The unit decoders U-DEC of the decoder unit 30 may be enabled in response to the enable signal received from the enable signal generator. The enable signal generator may generate the internal reference voltage setting codes CODE<6:0> and CODEB<6:0> using external reference voltage setting codes received from the controller, and may provide the generated internal reference voltage setting codes CODE<6:0> and CODEB<6:0> to the decoder unit 30.

The resistor string 10, the voltage selection switch unit 20 and the decoder unit 30 may be grouped into a plurality of cells for respective levels depending on the level of a reference voltage.

Figure 2:
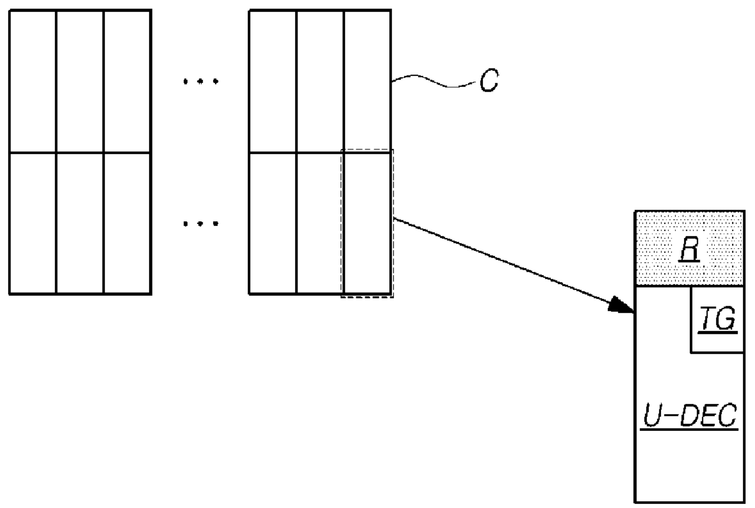
FIG. 2 is a layout diagram illustrating a cell disposition structure of an internal reference voltage generation device according to an embodiment of the disclosure.

FIG. 2 is a layout diagram illustrating a cell disposition structure of an internal reference voltage generation device according to an embodiment of the disclosure.

Referring to FIG. 2, an internal reference voltage generation device may include a plurality of cells C that provide reference voltages of different levels.

The plurality of cells C may be disposed in one or at least two rows to configure a cell array. For example, FIG. 2 illustrates a case in which the plurality of cells C are disposed in two rows.

Each cell C may include one of the divider resistors R of the resistor string 10 (see FIG. 1), one of the transmission gates TG of the voltage selection switch unit 20 (see FIG. 1) and one of the unit decoders U-DEC of the decoder unit 30 (see FIG. 1).

In each cell C, the divider resistor R and the transmission gate TG may be connected in common to one divider node, and may be connected to each other through the divider node. The transmission gate TG may output the voltage of the divider node as a reference voltage in response to a select signal. The unit decoder U-DEC may provide the select signal to the transmission gate TG.

The plurality of cells C may be regarded as being configured as the divider resistors R of the resistor string 10 (see FIG. 1), the transmission gates TG of the voltage selection switch unit 20 (see FIG. 1) and the unit decoders U-DEC of the decoder unit 30 (see FIG. 1), which are grouped for respective levels depending on the level of a reference voltage.

In each cell C, the transmission gate TG may be disposed adjacent to the divider resistor R. The unit decoder U-DEC may be disposed such that at least a portion of the unit decoder U-DEC is separated from the divider resistor R with the transmission gate TG interposed therebetween.

According to embodiments of the disclosed technology, since the divider resistor R and the transmission gate TG, which are connected in common to one divider node, are disposed in a single cell C, a wiring that constitutes the divider node may be formed to have a short length. In addition, since the divider resistor R and the transmission gate TG are disposed adjacent to each other in one cell C, so the wiring that constitutes the divider node may be formed to have a substantially short length connecting the divider resistor R and the transmission gate TG. By decreasing the RC delay of the wiring, a settling time may be shortened.

Figure 3:
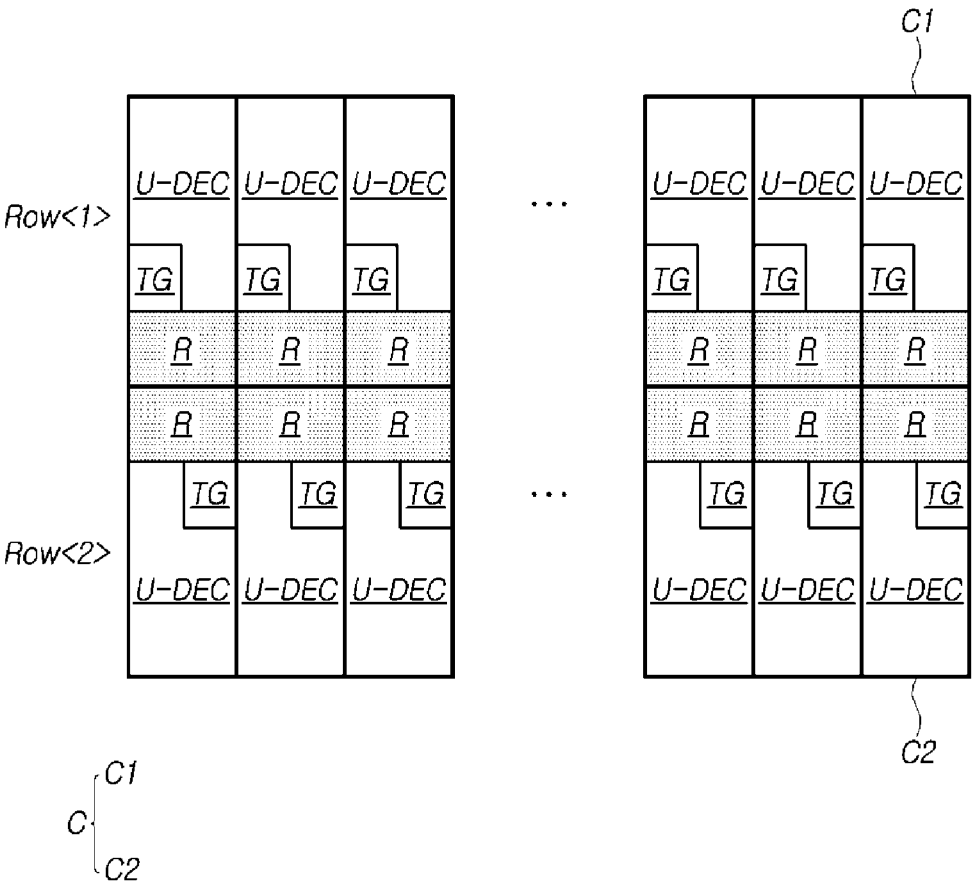
FIG. 3 is a diagram illustrating internal dispositions of cells of FIG. 2 according to an embodiment of the disclosure.

FIG. 3 is a diagram illustrating internal dispositions of cells of FIG. 2 according to an embodiment of the disclosure.

Referring to FIG. 3, a plurality of cells C may include first cells C1 that are disposed in a first row ROW<1> and second cells C2 that are disposed in a second row ROW<2>.

In each row, divider resistors R of the plurality of cells C may be disposed in a line in a row direction. That is to say, divider resistors R of the plurality of first cells C1 may be disposed in a line in the row direction, and divider resistors R of the plurality of second cells C2 may be disposed in a line in the row direction.

The divider resistors R of the first cells C1 and the divider resistors R of the second cells C2 may be disposed adjacent to each other. Divider resistors R of a first cell C1 and a second cell C2 may be disposed adjacent to each other in the column direction. A row of divider resistors R of a first cell C1 and a row of divider resistors R of a second cell C2 may be disposed adjacent to each other in the column direction.

The transmission gates TG of the first cells C1 may be disposed to one side in the row direction, respectively, of the divider resistors R of the first cells C1, and the transmission gates TG of the second cells C2 may be disposed to one side in the row direction, respectively, of the divider resistors R of the second cells C2. In the row direction, the unit decoders U-DEC of the first cells C1 may be disposed to the other side, respectively, of the divider resistors R of the first cells C1, and the unit decoders U-DEC of the second cells C2 may be disposed to the other side, respectively, of the divider resistors R of the second cells C2.

The plurality of cells C may have the same layout structure as each other or symmetrical layout structures to each other. As illustrated in FIG. 3, the first cells C1 may have the same layout structure, and the second cells C2 may have the same layout structure. The first cells C1 and the second cells C2 may have symmetrical layout structures relative to each other.

Since the plurality of cells C have the same layout structure as each other, or have symmetrical layout structures to each other, wirings that connect divider resistors and transmission gates may be formed to have a uniform length in the plurality of cells C. Therefore, it is possible to suppress or prevent the occurrence of a differential nonlinearity (DNL) error when the level of a reference voltage acts as an offset voltage of an input buffer due to a deviation in the length of a wiring.

Figure 4:
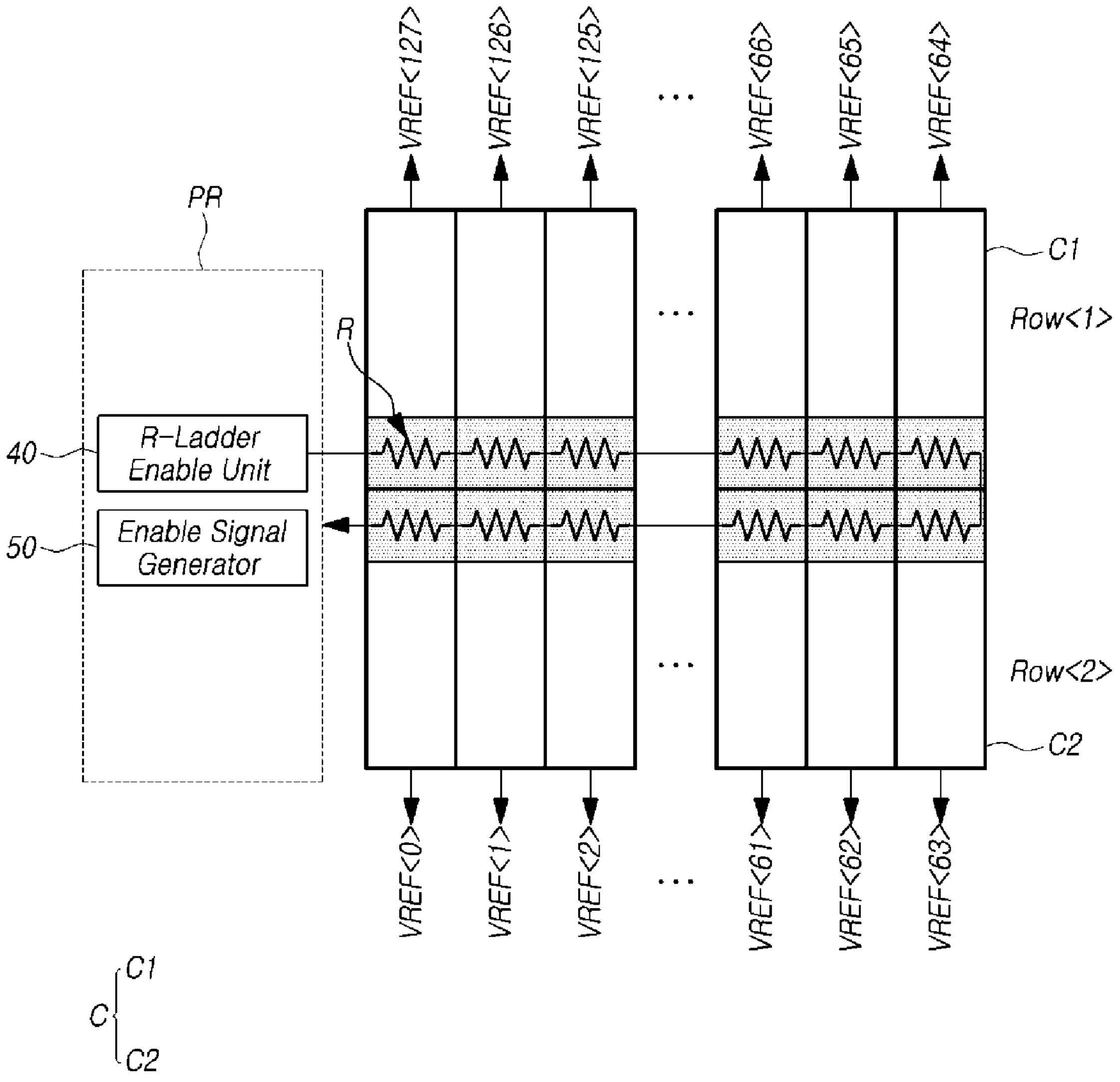
FIG. 4 is a diagram illustrating a connection structure of divider resistors according to an embodiment of the disclosure.

FIG. 4 is a diagram illustrating a connection structure of divider resistors according to an embodiment of the disclosure.

Referring to FIG. 4, divider resistors R of cells C that neighbor each other in each row may be connected in common to one divider node, and may be connected to each other through the one divider node. In each row, divider resistors R may be sequentially connected in cell disposition order.

The resistor string enable unit (R-Ladder Enable Unit) 40 may be disposed in a peripheral region PR, which neighbors the cell array in the row direction.

Among the first cells C1, a first cell C1 closest to the peripheral region PR may be connected to the resistor string enable unit 40, and may be connected to the power supply voltage terminal through the resistor string enable unit 40. Among the second cells C2, a second cell C2 closest to the peripheral region PR may be connected to the ground voltage terminal.

The divider resistor R of a first cell C1 farthest from the peripheral region PR among the first cells C1 and the divider resistor R of a second cell C2 farthest from the peripheral region PR among the second cells C2 may be connected in common to one divider node, and may be connected to each other through the one divider node.

The levels of reference voltages outputted from the first cells C1 may decrease as a distance from the peripheral region PR increases, and the levels of reference voltages outputted from the second cells C2 may increase as a distance from the peripheral region PR increases. For example, reference voltages VREF<127>, VREF<126>, VREF<125>, . . . , VREF<66>, VREF<65> and VREF<64>, which are outputted from the first cells C1, may have values corresponding to 128/128*VCCQ, 127/128*VCCQ, 126/128*VCCQ, . . . , 66/128*VCCQ, 65/128*VCCQ and 64/128*VCCQ, respectively, in an order in which they are arranged (near to far) from the peripheral region PR. Reference voltages VREF<0>, VREF<1>, VREF<2>, . . . , VREF<61>, VREF<62> and VREF<63>, which are outputted from the second cells C2, may have values corresponding to 1/128*VCCQ, 2/128*VCCQ, 3/128*VCCQ, . . . , 61/128*VCCQ, 62/128*VCCQ and 63/128*VCCQ, respectively, in an order in which they are arranged (near to far) from the peripheral region PR.

An enable signal generator 50 may be disposed in the peripheral region PR. The enable signal generator 50 may provide control signals to unit decoders of the cells C. The control signals may include internal reference voltage setting codes and enable signals for enabling the unit decoders. The control signals outputted from the enable signal generator 50 may be transferred to the unit decoders through signal lines.

Figure 5:
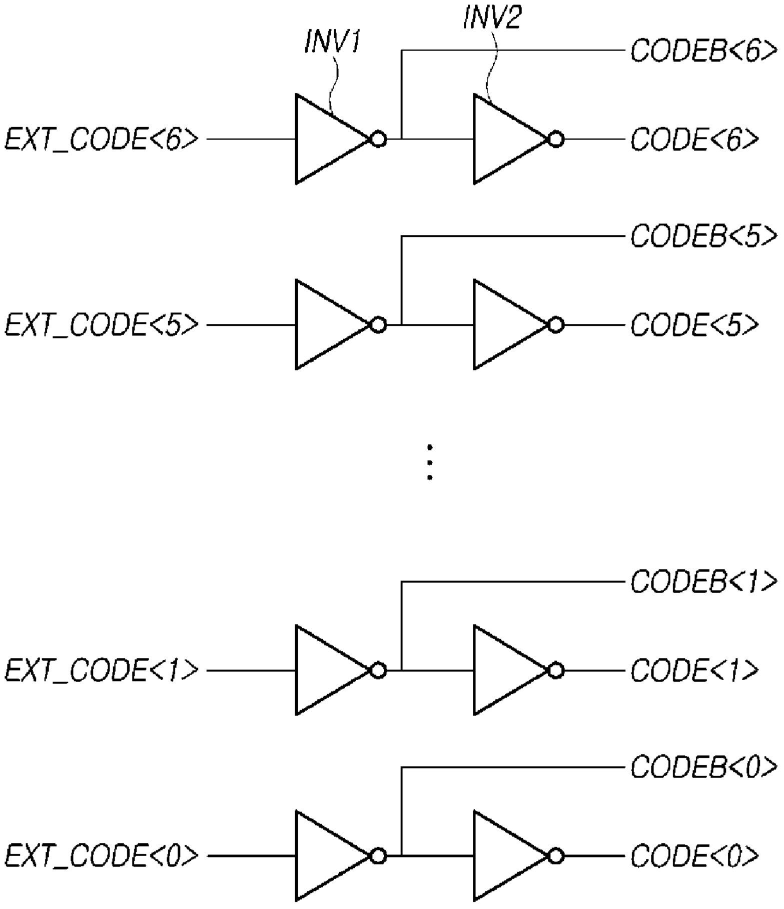
FIG. 5 is a circuit diagram illustrating a part of an enable signal generator of FIG. 4 according to an embodiment of the disclosure.

FIG. 5 is a circuit diagram illustrating a part of an enable signal generator of FIG. 4 according to an embodiment of the disclosure.

Referring to FIG. 5, an enable signal generator may receive external reference voltage setting codes EXT_CODE<6:0> from the controller, and may generate internal reference voltage setting codes CODE<6:0> and CODEB<6:0> using the received external reference voltage setting codes EXT_CODE<6:0>.

The internal reference voltage setting codes CODE<6:0> and CODEB<6:0> may include first internal reference voltage setting codes CODE<6:0> and second internal reference voltage setting codes CODEB<6:0>. The second internal reference voltage setting codes CODEB<6:0> may be codes that are obtained by inverting the first internal reference voltage setting codes CODE<6:0>.

For example, the enable signal generator may include a first inverter INV1, which generates a second internal reference voltage setting code CODEB<#> by inverting an external reference voltage setting code EXT_CODE<#>. The enable signal generator may also include a second inverter INV2, which generates a first internal reference voltage setting code CODE<#> by inverting the second internal reference voltage setting code CODEB<#>.

Figure 6:
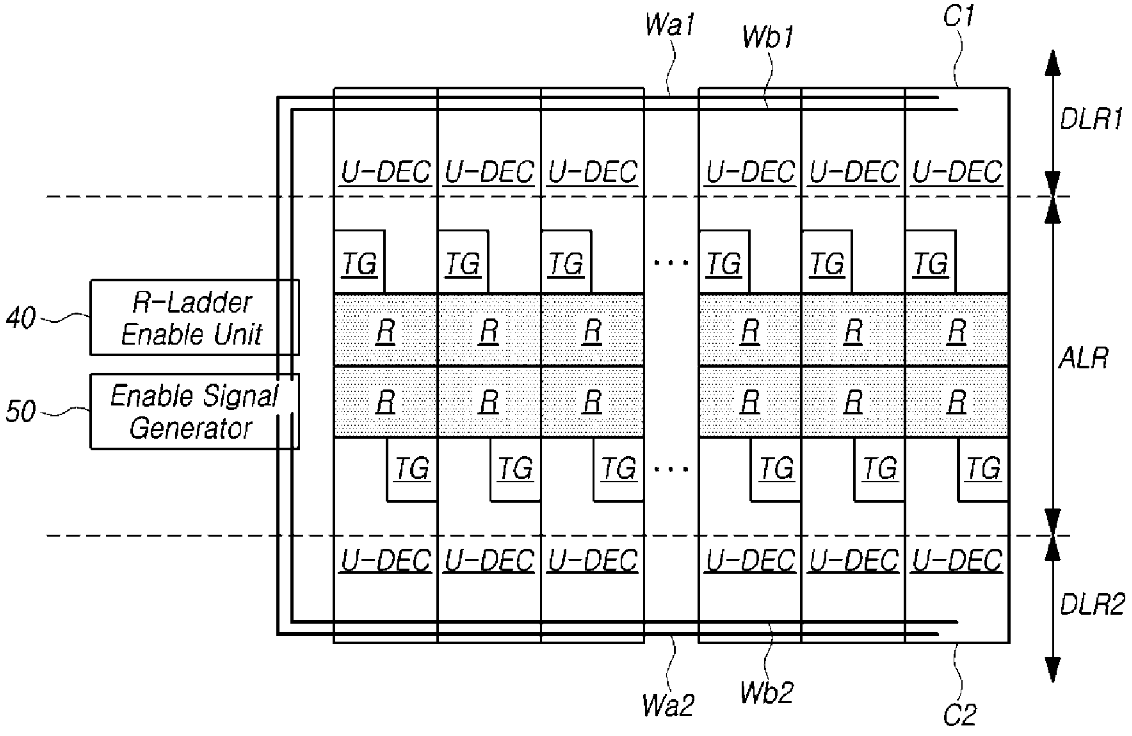
FIG. 6 is a diagram illustrating a disposition of signal lines connected to unit decoders according to an embodiment of the disclosure.

FIG. 6 is a diagram illustrating a disposition of signal lines connected to unit decoders according to an embodiment of the disclosure.

Referring to FIG. 6, the divider resistors R of the first and second cells C1 and C2 may be disposed in an analog level region ALR. The transmission gates TG of the first and second cells C1 and C2 may be disposed in the analog level region ALR.

At least a portion of the unit decoder U-DEC of the first cell C1 and at least a portion of the unit decoder U-DEC of the second cell C2 may be disposed in a first digital level region DLR1 and a second digital level region DLR2, respectively, on both sides in the column direction of the analog level region ALR.

The unit decoder U-DEC of the first cell C1 may be partially disposed in the first digital level region DLR1 of the first cell C1, and the unit decoder U-DEC of the second cell C2 may be partially disposed in the second digital level region DLR2 of the second cell C2.

The enable signal generator 50 may provide control signals to the unit decoders U-DEC of the first and second cells C1 and C2 through signal lines (e.g., Wa1, Wa2, Wb1 and Wb2). The signal lines may include first and second code transmission lines Wa1 and Wa2 and first and second enable signal lines Wb1 and Wb2.

The first code transmission line Wa1 may be connected between the enable signal generator 50 and the unit decoders U-DEC of the first cells C1 to transfer internal reference voltage setting codes outputted from the enable signal generator 50 to the unit decoders U-DEC of the first cells C1. The second code transmission line Wa2 may be connected between the enable signal generator 50 and the unit decoders U-DEC of the second cells C2 to transfer internal reference voltage setting codes outputted from the enable signal generator 50 to the unit decoders U-DEC of the second cells C2.

The first enable signal line Wb1 may be connected between the enable signal generator 50 and the unit decoders U-DEC of the first cells C1 to transfer enable signals outputted from the enable signal generator 50 to the unit decoders U-DEC of the first cells C1. The second enable signal line Wb2 may be connected between the enable signal generator 50 and the unit decoders U-DEC of the second cells C2 to transfer enable signals outputted from the enable signal generator 50 to the unit decoders U-DEC of the second cells C2.

The first code transmission line Wa1 may be disposed to overlap the first digital level region DLR1 of the first cell C1. The first code transmission line Wa1 may overlap the unit decoder U-DEC of the first cell C1, but not the divider resistor R of the first cell C1.

The first enable signal line Wb1 may be disposed to overlap the first digital level region DLR1 of the first cell C1. The first enable signal line Wb1 may overlap the unit decoder U-DEC of the first cell C1, but not the divider resistor R of the first cell C1.

The second code transmission line Wa2 may be disposed to overlap the second digital level region DLR2 of the second cell C2. The second code transmission line Wa2 may overlap the unit decoder U-DEC of the second cell C2, but not the divider resistor R of the second cell C2.

The second enable signal line Wb2 may be disposed to overlap the second digital level region DLR2 of the second cell C2. The second enable signal line Wb2 may overlap the unit decoder U-DEC of the second cell C2, and but not the divider resistor R of the second cell C2.

As is generally known in the art, an internal reference voltage setting code is a noisy bit signal that is generated using a mode register set signal of a DRAM or setting information (CNF) of a NAND. Unlike a digital circuit having high noise immunity, the divider resistors R are analog circuits that are vulnerable to noise.

According to embodiments of the disclosed technology, since the first and second code transmission lines Wa1 and Wa2, which transmit noisy bit signals, are disposed not to overlap the divider resistors R, it is possible to prevent or suppress noise of the first and second code transmission lines Wa1 and Wa2 from affecting the divider resistors R, thereby preventing or suppressing generation of power noise.

Moreover, since the first and second enable signal lines Wb1 and Wb2 are disposed not to overlap the divider resistors R, it is possible to prevent or suppress noise of the first and second enable signal lines Wb1 and Wb2 from affecting the divider resistors R.

Figure 7:
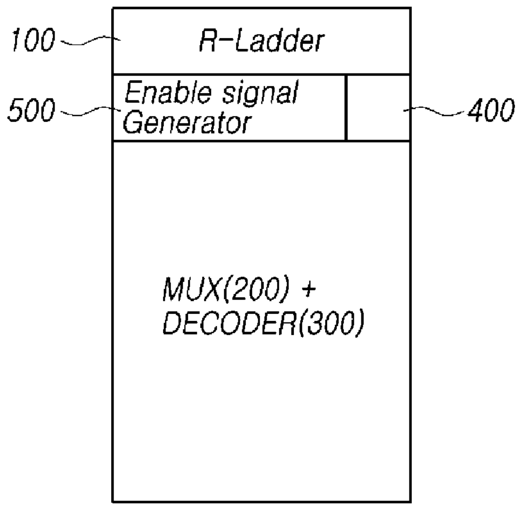
FIG. 7 is a diagram illustrating a schematic disposition of an internal reference voltage generation device according to an embodiment of the disclosure.

FIG. 7 is a diagram illustrating a schematic disposition of an internal reference voltage generation device according to an embodiment of the disclosure.

Referring to FIG. 7, a resistor string (R-Ladder) 100 may be disposed to be spaced apart from a digital circuit. For example, the resistor string 100 may be disposed in a separate region by being spaced apart from a voltage selection switch unit (MUX) 200 and a decoder unit (DECORDER) 300, and an adjacent resistor string enable unit 400 and enable signal generator 500.

In this case, because noise from the digital circuit may be prevented from entering the resistor string 100, power noise may be reduced. However, since a divider resistor and a transmission gate are located far apart from each other, a problem may arise in that the length of a wiring that constitutes a divider node is longer and an RC delay increases, which lengthens a settling time.

Also, a wiring that connects a divider resistor and a transmission gate has a different length for each level, and due to a deviation in the length of a wiring, the level of a reference voltage acts as an offset voltage of an input buffer, which may cause a differential nonlinearity error.

As described above, in embodiments of the disclosed technology, a resistor string, a voltage selection switch unit and a decoder unit may be grouped for respective levels to configure cells, and may be disposed by the unit of a cell to reduce the distance between a divider resistor and a transmission gate. Therefore, the length of a wiring that connects the divider resistor and the transmission gate may be reduced and an RC delay may decrease to shorten a settling time.

In addition, since a wiring that connects a divider resistor and a transmission gate may be formed in a uniform length for a plurality of levels, it is possible to suppress or prevent the occurrence of a differential nonlinearity error due to a deviation in the length of a wiring.

Figure 8:
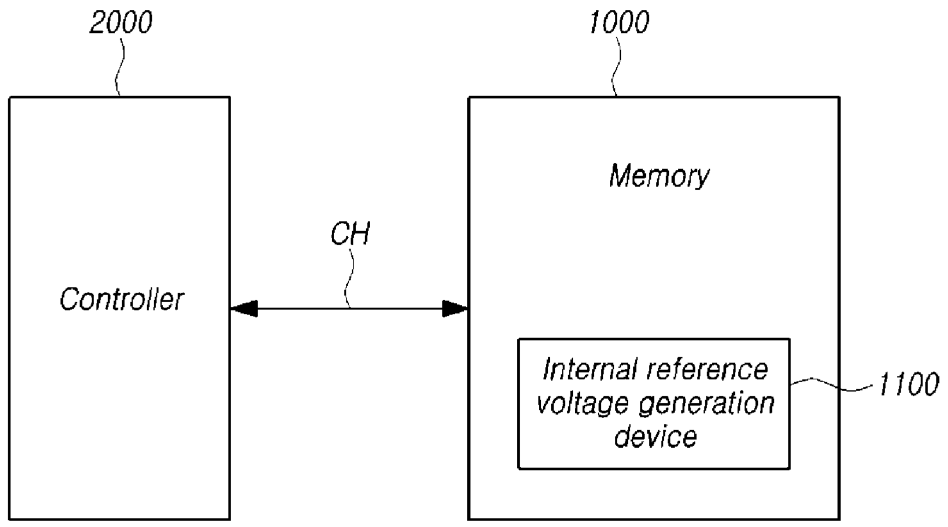
FIG. 8 is a block diagram illustrating a memory system including an internal reference voltage generation device according to an embodiment of the disclosure.

FIG. 8 is a block diagram illustrating a memory system including an internal reference voltage generation device according to an embodiment of the disclosure.

Referring to FIG. 8, a memory system may include a semiconductor memory device 1000 and a controller 2000.

The semiconductor memory device 1000 may be a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM) or a spin transfer torque random access memory (STT-RAM). In embodiments of the disclosed technology, the semiconductor memory device 1000 may be implemented as a three-dimensional array structure. The disclosed technology may be applied to not only a flash memory device in which a charge storage layer is configured by a conductive floating gate (FG), but also a charge trap flash (CTF) in which a charge storage layer is configured by a dielectric layer.

The semiconductor memory device 1000 operates in response to the control of the controller 2000. The semiconductor memory device 1000 includes a memory cell array that has a plurality of memory blocks. In some embodiments, the semiconductor memory device 1000 may be a flash memory device.

The semiconductor memory device 1000 is configured to receive a command and an address through a channel CH from the controller 2000 and to access a region selected by the address in the memory cell array. In other words, the semiconductor memory device 1000 performs an internal operation corresponding to the command, on a region selected by the address.

For example, the semiconductor memory device 1000 may perform a program operation, a read operation and an erase operation. In the program operation, the semiconductor memory device 1000 may program data to a region selected by the address. In the read operation, the semiconductor memory device 1000 may read data from a region selected by the address. In the erase operation, the semiconductor memory device 1000 may erase data stored in a region selected by the address.

The semiconductor memory device 1000 may include an internal reference voltage generation device 1100 according to the disclosed technology described above with reference to FIGS. 1 to 6.

The semiconductor memory device 1000 may include input buffers, which receive data inputted from the controller 2000. In an embodiment, the input buffer may be a differential input buffer that is driven using the difference between a reference voltage and inputted data.

The controller 2000 may set a reference voltage to be used by an input buffer that is included in the semiconductor memory device 1000. In detail, the controller 2000 may transmit a control signal for setting the reference voltage of an input buffer to the semiconductor memory device 1000 through the channel CH. The internal reference voltage generation device 1100 included in the semiconductor memory device 1000 may set the reference voltage of the input buffer on the basis of the inputted control signal. The control signal may be a combination of a command, an address and data for controlling the semiconductor memory device 1000. For example, the controller 2000 may provide, as the control signal, a reference voltage setting command (a command), a reference voltage setting address (an address) and an external reference voltage setting code (data) to the semiconductor memory device 1000. In an embodiment, the reference voltage setting command may be a command corresponding to a feature setting operation. The reference voltage setting address may be a feature address for setting a reference voltage according to the feature setting operation.

When the reference voltage setting command and the external reference voltage setting code are inputted, the internal reference voltage generation device 1100 may generate a select signal according to the inputted external reference voltage setting code. In detail, the internal reference voltage generation device 1100 may generate an internal reference voltage setting code using the inputted external reference voltage setting code, and may generate the select signal by decoding the internal reference voltage setting code. The internal reference voltage generation device 1100 may determine, as the reference voltage of the input buffer, a reference voltage corresponding to the select signal among a plurality of reference voltages having different voltage levels. The internal reference voltage generation device 1100 may provide the determined reference voltage to input buffers.

In various embodiments, the reference voltage of the input buffer may be set differently for each semiconductor memory device, each die, each plane or each memory block. For example, when the reference voltage of an input buffer needs to be set differently for each semiconductor memory device, each die, each plane or each memory block according to a variation in PVT (process, voltage and temperature), in an embodiment, the controller 2000 may measure the optimal reference voltage of an input buffer for each semiconductor memory device, each die, each plane or each memory block. The controller 2000 may provide, to the semiconductor memory device 1000, a reference voltage setting command (a command), a reference voltage setting address (an address) and an external reference voltage setting code (data) corresponding to the measured optical reference voltage.

In an embodiment, setting of the reference voltage of an input buffer of the semiconductor memory device 1000 may be performed after power is supplied to the semiconductor memory device 1000. For example, when the semiconductor memory device 1000 is powered up, the controller 2000 may perform an initial calibration operation for determining an optimal operating voltage of the semiconductor memory device 1000. Through this, the optimal reference voltage with which an input buffer of the semiconductor memory device 1000 operates may be determined. The controller 2000 may transmit, to the semiconductor memory device 1000, an external reference voltage setting code (data) corresponding to the optimal reference voltage determined through the initial calibration operation, by including the external reference voltage setting code (data) in a control signal.

In addition to the operation of setting the reference voltage of an input buffer, the controller 2000 may control the semiconductor memory device 1000 to perform a program operation, a read operation or an erase operation. In the program operation, the controller 2000 may provide a program command, an address and data to the semiconductor memory device 1000 through the channel CH. In the read operation, the controller 2000 may provide a read command and an address to the semiconductor memory device 1000 through the channel CH. In the erase operation, the controller 2000 may provide an erase command and an address to the semiconductor memory device 1000 through the channel CH.

Although not illustrated in the drawing, as an embodiment, the controller 2000 may include components such as a RAM (random access memory), a processing unit, a host interface and a memory interface.

The RAM is used as at least one among an operating memory of a processing unit, a cache memory between the semiconductor memory device 1000 and a host and a buffer memory between the semiconductor memory device 1000 and the host.

The processing unit controls general operations of the controller 2000. The processing unit is configured to control a read operation, a program operation, an erase operation and a background operation of the semiconductor memory device 1000. The processing unit is configured to drive firmware for controlling the semiconductor memory device 1000. In an embodiment, the processing unit may perform the function of a flash translation layer (FTL). The processing unit may translate a logical block address (LBA) provided by the host into a physical block address (PBA) through the flash translation layer (FTL). The flash translation layer (FTL) may receive the logical block address (LBA) and translate the received logical block address (LBA) into the physical block address (PBA), by using a mapping table. There are various address mapping methods of the flash translation layer, depending on a mapping unit. Representative address mapping methods include a page mapping method, a block mapping method and a hybrid mapping method.

The processing unit is configured to randomize data received from the host. For example, the processing unit may randomize data received from the host, by using a randomizing seed. Randomized data as data to be stored is provided to the semiconductor memory device 1000 and is programmed to the memory cell array.

In a read operation, the processing unit is configured to derandomize data received from the semiconductor memory device 1000. For example, the processing unit may derandomize data received from the semiconductor memory device 1000, by using a derandomizing seed. Derandomized data may be outputted to the host. In an embodiment, the processing unit may perform randomization and de-randomization by driving software or firmware.

The host interface may include a protocol for performing data exchange between the host and the controller 2000. As an embodiment, the controller 2000 is configured to communicate with the host through at least one among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

The memory interface interfaces with the semiconductor memory device 1000. For example, the memory interface includes a NAND interface or a NOR interface.

As is apparent from the above description, according to embodiments of the disclosed technology, a resistor string, a voltage selection switch unit and a decoder unit may be grouped for respective levels to configure cells, and may be disposed by the unit of a cell to reduce the distance between a divider resistor and a transmission gate. Therefore, the length of a wiring that connects the divider resistor and the transmission gate may be reduced and an RC delay may decrease, which shortens a settling time.

In addition, since cells that provide reference voltages of different levels have the same layout structure or symmetrical layout structures, wirings that connect divider resistors and transmission gates may be formed in a uniform length in a plurality of cells. Therefore, it is possible to suppress or prevent the occurrence of a differential nonlinearity (DNL) error when the level of a reference voltage acts as an offset voltage of an input buffer due to a deviation in the length of a wiring.

Further, since a divider resistor and a transmission gate are disposed adjacent to each other, global routing wiring is not needed for the connection between the divider resistor and the transmission gate, so the number of global routing wirings may be reduced and a wiring region for global routing may be additionally secured, whereby it is possible to increase a design margin.

Moreover, since a signal line that transmits a noisy bit signal does not overlap the resistor string, it is possible to suppress or prevent the noise of the signal line from entering the resistor string to cause the occurrence of power noise.

The above-described exemplary embodiments of the disclosure may be implemented not only through an apparatus and method but also through a program that realizes a function corresponding to a configuration of the exemplary embodiment of the disclosure or through a recording medium on which the program is recorded, and can be easily implemented by a person of ordinary skill in the art from the description of the foregoing exemplary embodiment.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. An internal reference voltage generation device comprising:

a cell array including a plurality of cells that provide reference voltages of different levels, each of the plurality of cells comprising:

one of a plurality of divider resistors included in a resistor string;

a transmission gate configured to output a voltage of a divider node, which is connected to the one of the plurality of divider resistors, in response to a select signal; and a unit decoder configured to provide the select signal to the transmission gate, wherein the plurality of cells includes a plurality of first cells that are disposed in a first row and a plurality of second cells that are disposed in a second row, wherein the plurality of divider resistors includes a plurality of first divider resistors in the plurality of first cells and a plurality of second divider resistors in the plurality of second cells, wherein the plurality of first divider resistors and the plurality of second divider resistors are connected in serial between a power supply voltage terminal and a ground voltage terminal.

2. The internal reference voltage generation device according to claim 1, wherein the plurality of cells have the same layout structure or have symmetrical layout structures relative to each other.

3. The internal reference voltage generation device according to claim 1, wherein in each of the first and second rows, divider resistors of cells are disposed in a line in a row direction.

4. The internal reference voltage generation device according to claim 1, wherein in each of the first and second rows, divider resistors of cells adjacent to each other are connected in common to one divider node.

5. The internal reference voltage generation device according to claim 1, further comprising:

a resistor string enable unit connected between a first voltage and the resistor string and disposed in a peripheral region adjacent to the plurality of cells in a row direction.

6. The internal reference voltage generation device according to claim 5, wherein levels of reference voltages outputted from the plurality of first cells decrease as a distance from the peripheral region increases, and levels of reference voltages outputted from the plurality of second cells increase as a distance from the peripheral region increases.

7. The internal reference voltage generation device according to claim 5, wherein a divider resistor of a first cell farthest from the peripheral region and a divider resistor of a second cell farthest from the peripheral region are connected in common to one divider node.

8. The internal reference voltage generation device according to claim 1, wherein a divider resistor of a first cell and a divider resistor of a second cell are disposed in an analog level region, and at least a portion of a unit decoder of the first cell and at least a portion of a unit decoder of the second cell are disposed in a first digital level region and a second digital level region, respectively, on both sides of the analog level region.

9. The internal reference voltage generation device according to claim 8, further comprising:

a first code transmission line configured to transfer an internal reference voltage setting code to a unit decoder of the first cell; and a second code transmission line configured to transfer an internal reference voltage setting code to a unit decoder of the second cell, wherein the first code transmission line is disposed to overlap the first digital level region of the first cell and not to overlap the analog level region of the first cell, and the second code transmission line is disposed to overlap the second digital level region of the second cell and not to overlap the analog level region of the second cell.

10. An internal reference voltage generation device comprising:

a resistor string configured to divide a power supply voltage into a plurality of levels;

a voltage selection switch unit including a plurality of transmission gates that are connected to a plurality of divider nodes, respectively, of the resistor string and that output a voltage of any one among the plurality of divider nodes as a reference voltage in response to a select signal; and a decoder unit including a plurality of unit decoders that provide the select signal to the plurality of transmission gates, wherein one of divider resistors of the resistor string, one transmission gate that is connected to one divider node in common with the one of the divider resistors and one unit decoder that provides the select signal to the one transmission gate are grouped and disposed to configure one of a plurality of cells, wherein the plurality of cells includes a plurality of first cells that are disposed in a first row and a plurality of second cells that are disposed in a second row, wherein the divider resistors includes a plurality of first divider resistors in the plurality of first cells and a plurality of second divider resistors in the plurality of second cells, wherein the plurality of first divider resistors and the plurality of second divider resistors are connected in serial between a power supply voltage terminal and a ground voltage terminal.

11. The internal reference voltage generation device according to claim 10, wherein in each of the first and second rows, divider resistors of cells are disposed in a line in a row direction.

12. The internal reference voltage generation device according to claim 10, wherein in each of the first and second rows, divider resistors of cells are sequentially connected in cell disposition order.

13. The internal reference voltage generation device according to claim 10, wherein transmission gates of the plurality of first cells and transmission gates of the plurality of second cells are disposed, respectively, adjacent to divider resistors of the pluralities of first and second cells.

14. The internal reference voltage generation device according to claim 10, wherein unit decoders of the plurality of first cells and unit decoders of the plurality of second cells are disposed on sides, respectively, of divider resistors of the pluralities of first and second cells.

15. The internal reference voltage generation device according to claim 10, further comprising:

a resistor string enable unit connected between a power supply voltage and the resistor string, and disposed in a peripheral region adjacent to the plurality of cells in a row direction.

16. The internal reference voltage generation device according to claim 15, wherein levels of reference voltages outputted from the plurality of first cells decrease as a distance from the peripheral region increases, and levels of reference voltages outputted from the plurality of second cells increase as a distance from the peripheral region increases.

17. The internal reference voltage generation device according to claim 15, wherein a divider resistor of a first cell farthest from the peripheral region and a divider resistor of a second cell farthest from the peripheral region are connected in common to one divider node.

18. The internal reference voltage generation device according to claim 10, wherein a divider resistor of a first cell and a divider resistor of a second cell are disposed in an analog level region, and at least a portion of a unit decoder of the first cell and at least a portion of a unit decoder of the second cell are disposed in a first digital level region and a second digital level region, respectively, on both sides of the analog level region.

19. The internal reference voltage generation device according to claim 10, further comprising:

a code transmission line configured to transfer internal reference voltage setting codes to unit decoders of the plurality of cells, wherein the code transmission line is disposed not to overlap divider resistors of the plurality of cells.

20. An internal reference voltage generation device comprising:

a resistor string configured to divide a power supply voltage into a plurality of levels;

a voltage selection switch unit including a plurality of transmission gates that are connected to a plurality of divider nodes, respectively, of the resistor string and that output a voltage of any one among the plurality of divider nodes as a reference voltage in response to a select signal;

a decoder unit including a plurality of unit decoders that provide the select signal to the plurality of transmission gates; and a resistor string enable unit connected between a power supply voltage and the resistor string, and disposed in a peripheral region adjacent to a plurality of cells in a row direction, wherein one of divider resistors of the resistor string, one transmission gate that is connected to one divider node in common with the one of the divider resistors and one unit decoder that provides the select signal to the one transmission gate are grouped and disposed to configure one of the plurality of cells, and wherein levels of reference voltages outputted from a plurality of first cells decrease as a distance from the peripheral region increases, and levels of reference voltages outputted from a plurality of second cells increase as a distance from the peripheral region increases.

* * * * *